United States Patent [19]

Gilmer

[11] Patent Number: 5,414,036
[45] Date of Patent: May 9, 1995

[54] RAPIDLY CRYSTALLIZING POLYESTER MOLDING COMPOSITIONS

[75] Inventor: John W. Gilmer, West Windsor, N.J.

[73] Assignee: Enichem S.p.A., Italy

[21] Appl. No.: 45,943

[22] Filed: Apr. 12, 1993

[51] Int. Cl.⁶ .............................................. C08L 67/02
[52] U.S. Cl. .................................. 524/394; 525/175; 525/176
[58] Field of Search ................ 525/176, 175; 526/313; 524/394

[56] References Cited

U.S. PATENT DOCUMENTS

| | | | |
|---|---|---|---|
| 4,305,864 | 12/1981 | Griffin et al. | 260/40 R |
| 4,322,335 | 4/1982 | Nield | 523/522 |
| 4,352,904 | 10/1982 | Deyrup | 524/292 |
| 4,368,288 | 1/1983 | Nield | 524/539 |
| 4,390,493 | 6/1983 | Yasui et al. | 264/328.16 |
| 4,393,178 | 7/1983 | Legras et al. | 525/437 |
| 4,486,564 | 12/1984 | Deyrup | 524/308 |

FOREIGN PATENT DOCUMENTS

| | | | |
|---|---|---|---|
| 21648 | 1/1981 | European Pat. Off. | C08G 63/76 |
| 351732 | 1/1990 | European Pat. Off. | C08K 5/13 |

OTHER PUBLICATIONS

Garcia, *J. Polymer Sci.*, 22, 2063–72.

*Primary Examiner*—Patricia A. Short
*Attorney, Agent, or Firm*—Lerner, David, Littenberg, Krumholz & Mentlik

[57] ABSTRACT

Molding compositions of thermoplastic polyesters and polymeric nucleating additives having pendant ionizable alkali metal phenolate groups. A process for increasing the crystallization rate and crystallization temperature of thermoplastic polyesters by incorporating into the polyesters the polymeric nucleating additives of the present invention.

16 Claims, 6 Drawing Sheets

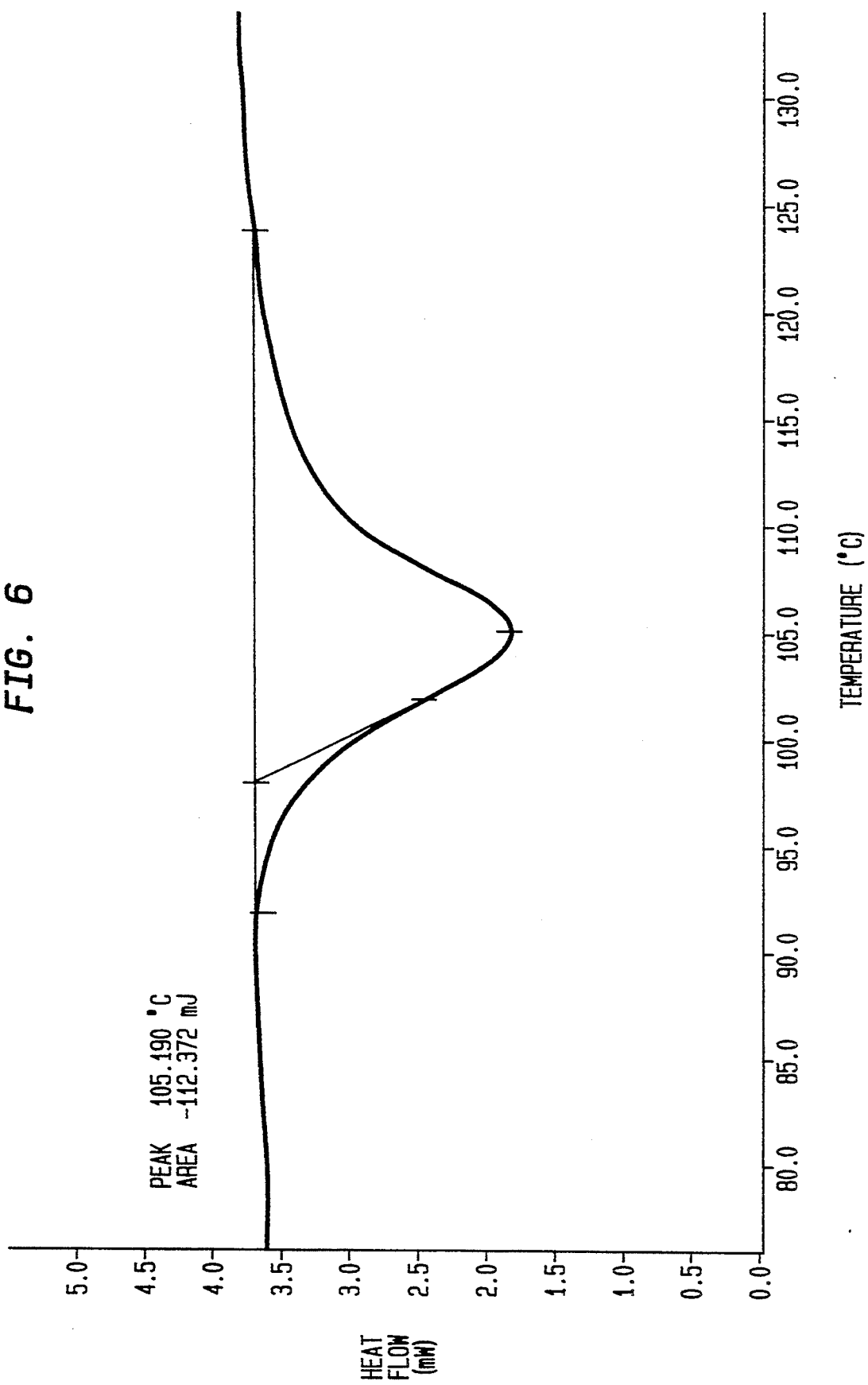

RAPIDLY CRYSTALLIZING POLYESTER

MOLDING COMPOSITIONS

This invention relates to rapidly crystallizing polyester molding compositions containing polymeric nucleating additives having pendant ionizable alkali metal phenolate groups. In particular, the present invention relates to rapidly crystallizing molding compositions of polyethylene terephthalate (PET) containing the nucleating additives of the present invention.

The crystallization rate of polyesters such as PET has long presented a problem for practitioners of the injection molding art. Polyesters crystallize relatively slowly compared to other conventional injection molding polymers, requiring longer cycling times for molding of dimensionally stable articles. When polyester articles are not permitted to remain in an injection mold until sufficiently crystallized, the article continues to crystallize after removal from the mold, with a consequential change in volume and dimension.

The prior art has sought to increase the crystallization rate of polyesters by compounding with nucleating additives to increase the temperature at which the material crystallizes. The nucleating additives are commonly ionizable metal salts of organic compounds having at least one acidic proton from which the ionizable metal salt is formed. For example, U.S. Pat. Nos. 4,352,904 and 4,486,564 to Deyrup disclose the use as nucleating additives of polymeric and non-polymeric sodium or potassium salts of carboxyl containing organic compounds, particularly carboxylate salts. The use of ionizable metal salts of non-polymeric aromatic rings substituted with acid groups selected from carboxylic acid, sulphinic acid, phosphonic acid, phosphinic acid and phenol groups are disclosed in U.S. Pat. Nos. 4,322,335 and 4,368,288 to Nield, U.S. Pat. No. 4,305,864 to Griffin, U.S. Pat. No. 4,390,493 to Yasui, U.S. Pat. No. 4,393,178 to Legras, EP 21,648 to Biebuyck and EP 351,732 to Karasawa.

Garcia, J. Polymer Sci., 22, 2063-72 (1984) discloses that when ionizable metal salts of non-polymeric organic compounds are used as nucleating additives, however, the polyesters suffer a substantial drop in molecular weight. Garcia proposes that the following reaction between PET and the nucleating additive is responsible for the drop in molecular weight, using sodium benzoate as the nucleating additive for purposes of illustration.

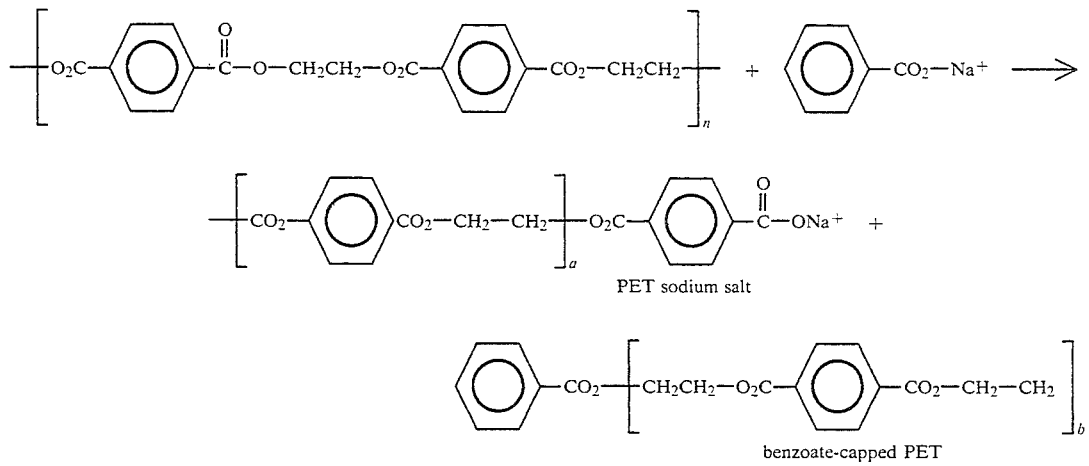

wherein $a+b=n$.

Polyesters having reduced molecular weights demonstrate significantly reduced izod impact strength, tensile strength and modulus and flexural strength and modulus. Efficient polyester nucleating additives that did not significantly detract from the polyester's molecular weight, and consequently the mechanical properties, therefore would be highly desirable.

SUMMARY OF THE INVENTION

It has now been discovered that the alkali metal salts of polymers having pendant ionizable phenolate groups function efficiently as polyester nucleating additives without significantly detracting from the molecular weight of the polyester and, hence, the mechanical properties of articles molded from the polyester. Therefore, in accordance with the present invention, there is provided a rapidly crystallizing melt-stable thermoplastic polyester molding composition prepared from a thermoplastic polyester and a polymeric nucleating additive having pendant alkali metal phenolate groups. Preferably, the polymeric nucleating additive having pendant alkali metal phenolate groups is present in an amount effective to increase the crystallization temperature of the polyester at least 15° C.

The addition of the ionizable polymeric alkali metal phenolate nucleating additive significantly improves the crystallization rate of the polyester molding composition into which it is incorporated. The molecular weight of the polyester, and, consequently, the physical properties of the articles molded therefrom, such as izod impact strength, tensile strength and modulus or flexural strength and modulus, are not adversely affected. The physical properties are measured according to ASTM test procedures, including procedures set forth in ASTM-D256 for impact strength, ASTM-D638 for tensile strength and modulus and ASTM-D790 for flexural strength and modulus. The crystallization rate characteristics are determined by conventional Differential Scanning Calorimetry (DSC) techniques, the particulars of which are set forth hereinafter, in addition to simply determining the fastest rate at which dimensionally stable articles may be produced by injection molding.

The polymeric nucleating additives of the present invention are derived from phenolic monomers such as p-hydroxystyrene and copolymers thereof. Phenolic monomers require substitution of the phenol moiety with a protecting group prior to polymerization. After polymerization, cleavage of the protecting group with a strong base such as an alkali metal hydroxide yields the alkali metal phenolate salts of the present invention, together with the alkali metal salt of the protecting group, typically a lower alkyl carboxylate.

Rather than separate the alkali metal salt of the protecting group from the alkali metal phenolate, the present invention includes the discovery that the alkali metal salts of the protecting groups function effectively as polyester nucleating additives. Therefore, the present invention also includes a polyester nucleating additive blend of a polymeric nucleating additive containing pendant ionizable alkali metal phenolate groups and an alkali metal salt of a phenol protecting group. A preferred group of phenol protecting group alkali metal salts is the alkali metal lower alkyl carboxylates.

The present invention also includes a method for forming the polyester nucleating additive blend of the present invention, which method includes the steps of:

providing a polymer containing phenolic monomeric repeating units, wherein the phenol moieties are substituted with protecting groups;

cleaving said protecting groups from said phenolic monomeric repeating units with an alkali metal base, so that a mixture is formed comprising a polymer having pendant ionizable alkali metal phenolate groups and the alkali metal salt of the protecting groups; and forming the mixture into a blend of the polymer having pendant ionizable alkali metal phenolate groups and the alkali metal salt of the protecting groups.

The copolymers of phenolic monomers such as p-hydroxystyrene may be formed with comonomers that improve the physical properties of the polyester molding composition. Therefore, the present invention includes polymeric nucleating additives for polyester molding compositions, which additives consist of a polymer containing first and second monomeric repeating units. The first monomeric repeating unit has a pendant ionizable alkali metal phenolate group. The second monomeric repeating unit is selected to provide the polymer with the ability to improve a physical property of the polyester molding composition.

The second monomeric repeating unit may be selected that improves the impact properties of blends of the polyester with other thermoplastic polymers. Low $T_g$ second monomeric repeating units may also be selected that improve the low temperature crystallization of the polyester molding composition, i.e., the crystallization rate of the polyester at the molding temperature.

To improve the low temperature crystallization of the polyester molding composition, the second monomeric repeating unit should provide the polymer with a $T_g$ lower than the polyester to be molded. Preferred second monomeric repeating units capable of providing the polymer with a $T_g$ lower than the polyester to be molded are acrylates having a structure represented by:

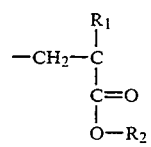

wherein $R_1$ is selected from hydrogen, methyl and ethyl and $R_2$ is selected from alkyl groups containing up to 20 carbon atoms.

The polymeric nucleating additives of the present invention having first and second monomeric repeating units may also be blended with alkali metal salts of phenol monomers protecting groups. The blends may be formed in accordance with the methods of the present invention disclosed herein.

Further in accordance with the present invention, a method is also provided for producing a dimensionally stable molded polyester article by providing a molding composition of a linear saturated polyester and incorporating therein a polymeric nucleating additive containing pendant ionizable alkali metal phenolate groups, and then molding the polyester molding composition.

While not being bound by any particular theory, the alkali metal phenolate groups of the polymeric nucleating additives of the present invention are believed to transfer sodium ions to polyester chains more rapidly by the mechanism proposed by Garcia than the prior art carboxylic acid salts because alkali metal phenolate salts are stronger bases than carboxylic acid salts. Thus, it may be possible to use lower levels of the polymeric alkali metal phenolate nucleating additives of the present invention than the polymeric carboxylic acid salts of the prior art.

Furthermore, the improved mechanical properties of articles molded from the polyester molding compositions containing the polymeric alkali metal phenolate nucleating additives of the present invention, as well as the loss of mechanical properties experienced with articles molded from the polyester molding compositions of the prior art containing non-polymeric nucleating additives of carboxylic acid salts and inorganic alkali metal salts, are believed to be attributable to the mechanism proposed by Garcia in which the alkali metal salt attacks the ester carboxyl group of the polyester, cleaving the polymer into ionic and nonionic species. The ionic species then aggregate, acting as seeds for the crystallization.

The nucleating additives of the prior art react to produce ionic and nonionic polyester species having a lower molecular weight, particularly a lower number average molecular weight, compared to the polyester starting material. The polyester divides into two parts and the sodium atom and nonpolymeric organic group that attach to the respective ionic and nonionic polyester species do not contribute significantly to the molecular weight of either species. This molecular weight reduction caused by the nucleating additive results in the loss of mechanical properties in articles molded from polyester molding compositions containing prior art non-polymeric nucleating additives of organic alkali metal salts.

With the polyester molding compositions of the present invention, the nonionic polyester species resulting from cleaving of the polyester starting material has the polymeric nucleating additive covalently bonded thereto, with the alkali metal ionically bonded to the ionic polyester species. The nonionic species do not suffer from considerable loss of molecular weight, as a result of which, the mechanical properties of articles molded from the polyester molding compositions of the present invention are preserved. In addition, because it may be possible to utilize lower levels of the nucleating additives of the present invention, the loss of molecular weight and consequential loss of mechanical properties may be even further reduced.

It is noted that U.S. Pat. Nos. 4,352,904 and 4,486,564 to Deyrup disclose polyester nucleating additives of alkali metal salts of carboxyl containing polymers that increase the crystallization rate of the polyesters so that articles molded therefrom have high gloss when molded at temperatures below 110° C. However, non-polymeric carboxylic acid nucleating additives are also disclosed, and these references fail to distinguish between the polymeric and non-polymeric additives. There is no suggestion that improvements in molecular weight and mechanical properties can be obtained with the use of polymeric nucleating additives over non-polymeric additives. This is not surprising when one considers that as recently as 1989, Dekoninick et al., Polymer, 30, 910-3 (1989), failed to recognize that the mechanism of the reaction of polyesters with organic alkali metal salt nucleating additives included the cleaving of the polymer backbone of the polyester by the alkali metal salt.

The polyester molding compositions of the present invention utilize polymeric nucleating additives to compensate for the molecular weight reduction resulting from the cleaving of the polymer backbone of the polyester by the nucleating additive and preserve the mechanical properties of articles molded therefrom.

BRIEF DESCRIPTION OF THE DRAWINGS

FIG. 6 depicts a DSC scan of the polyester of FIG. 2 containing 4% by weight of sodium-modified poly(p-hydroxystyrene-lauryl methacrylate), and performed under the same conditions.

DETAILED DESCRIPTION OF THE PREFERRED EMBODIMENT

Figure 1:
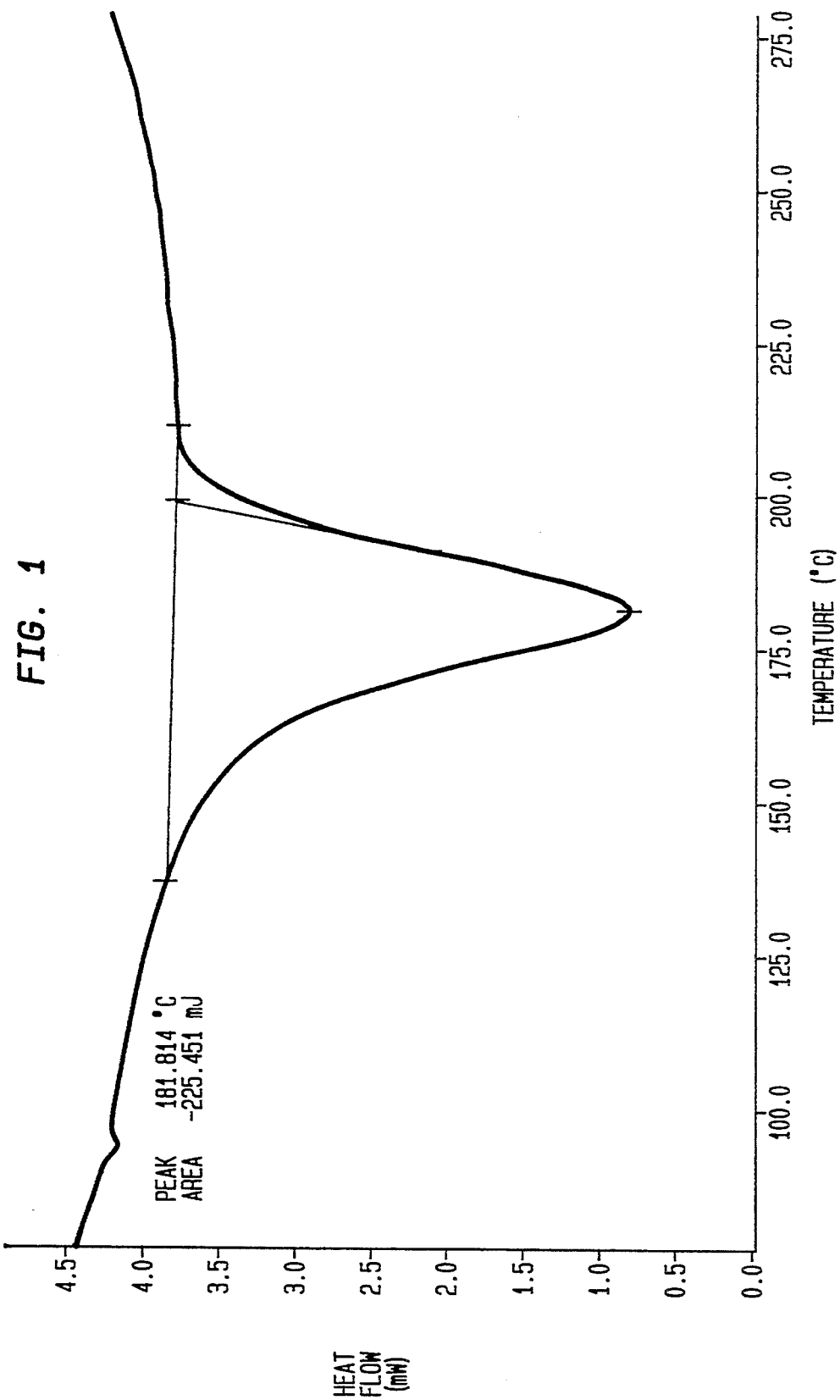
FIG. 1 depicts a DSC scan of poly(ethylene terephthalate) annealed at 290° C. for two minutes and then cooled at a rate of 20° C./min.
Figure 2:
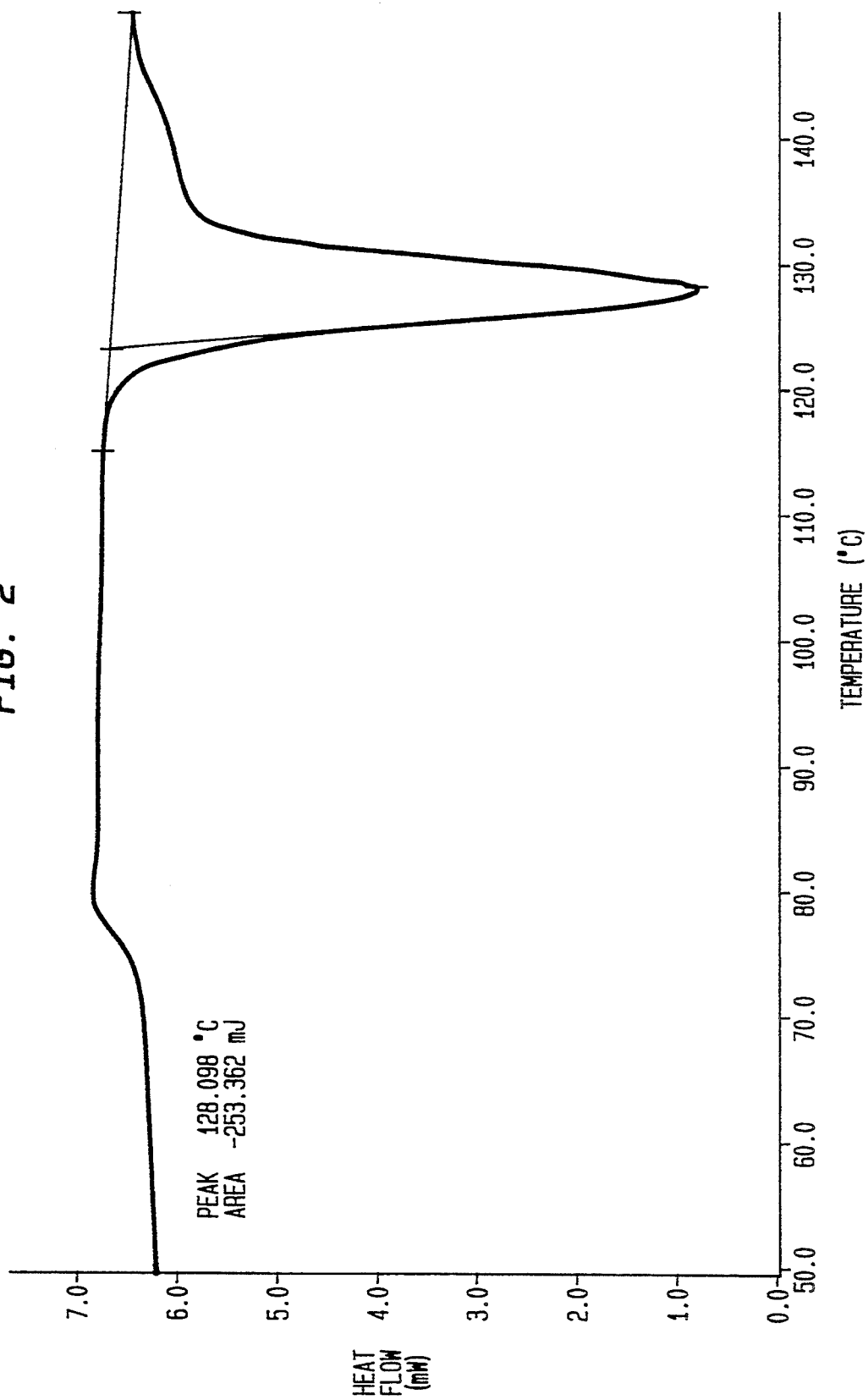
FIG. 2 depicts a DSC scan of poly(ethylene terephthalate) annealed at 290° C. for two minutes, quenched rapidly to room temperature, and then heated at a rate of 10° C./min.
Figure 3:
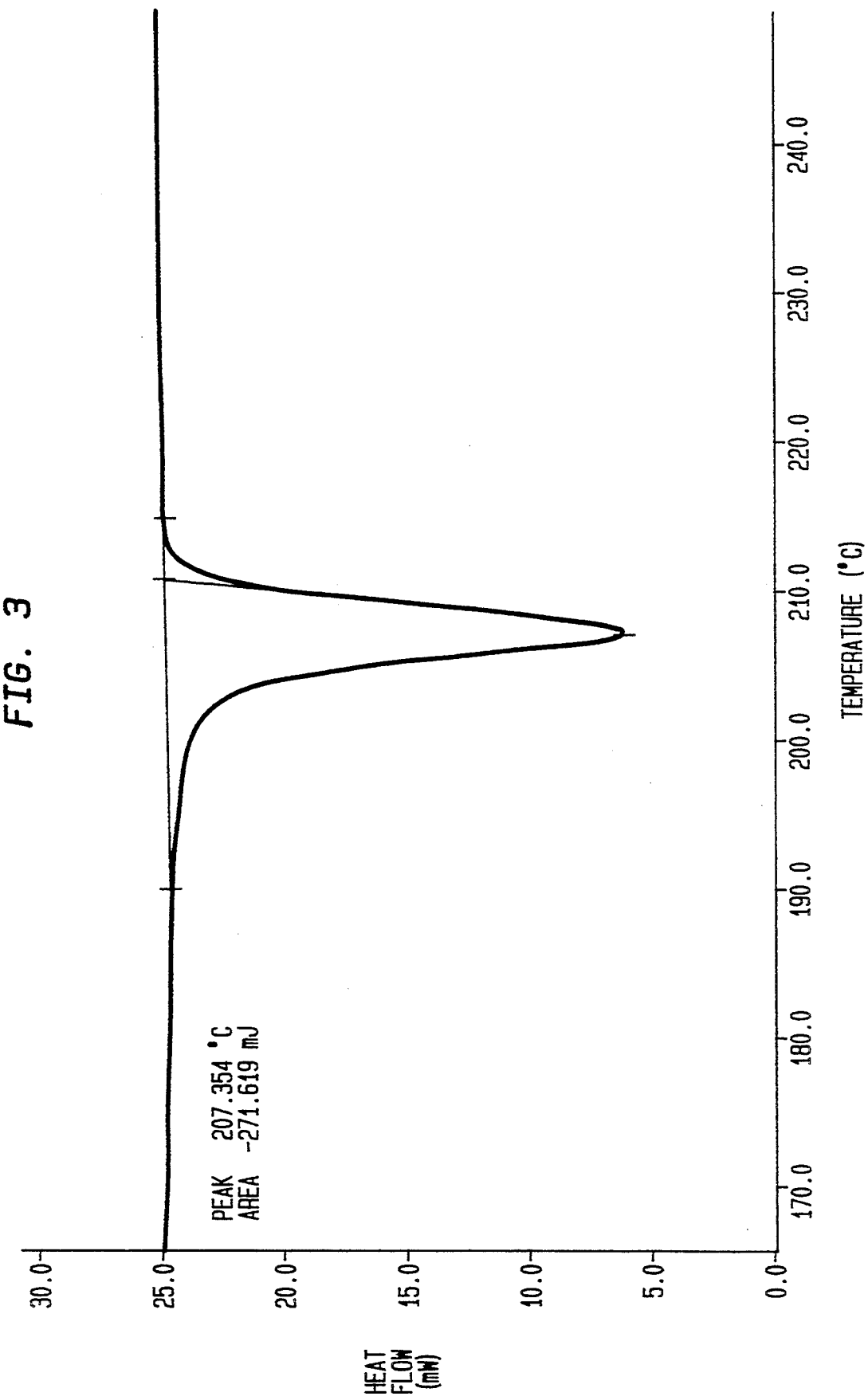
FIG. 3 depicts a DSC scan of the polyester of FIG. 1 containing 1% by weight of sodium-modified poly(p-hydroxystyrene) and performed under the same conditions.
Figure 4:
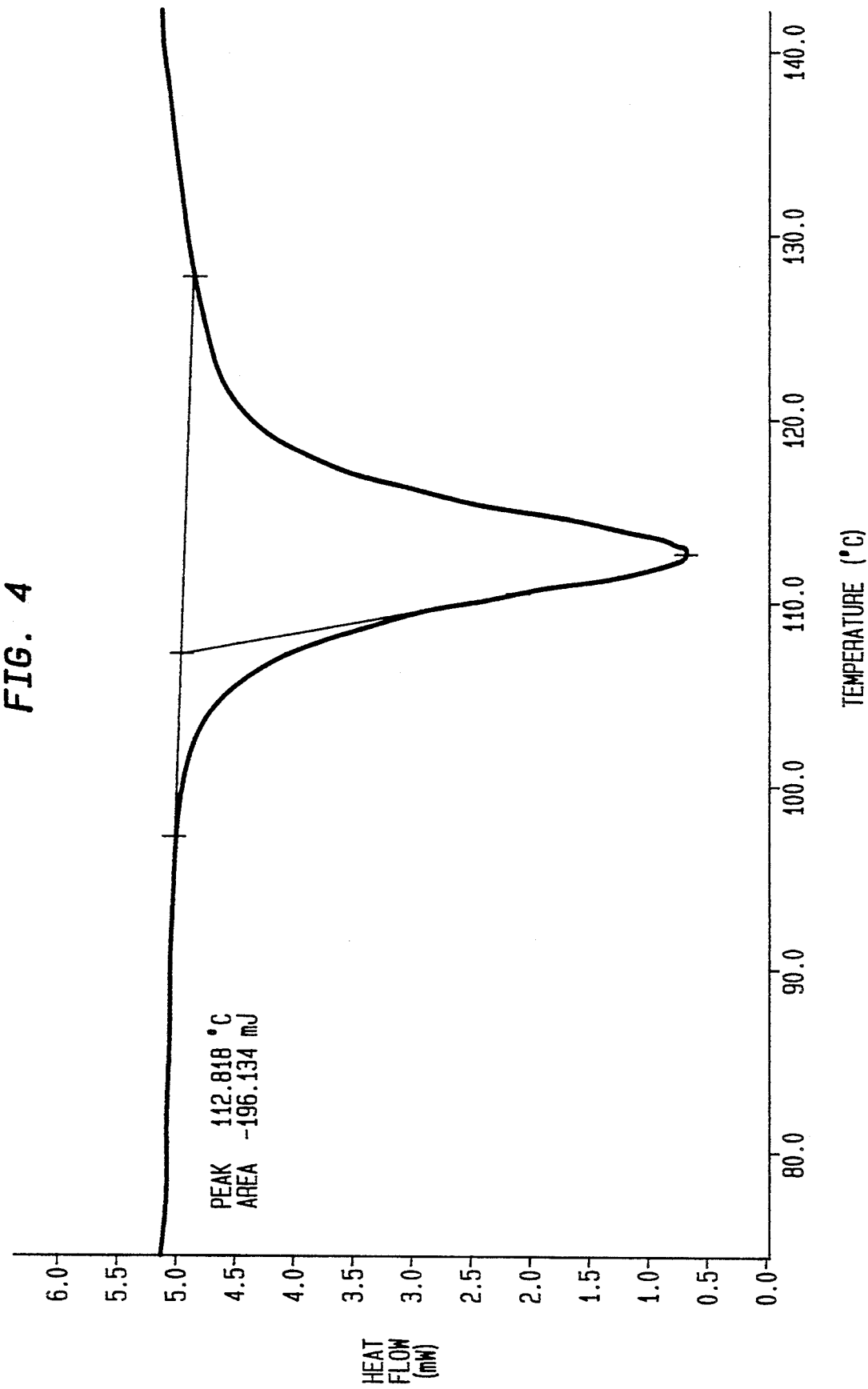
FIG. 4 depicts a DSC scan of the polyester of FIG. 2 containing 1% by weight of sodium-modified poly(p-hydroxystyrene) and performed under the same conditions.

The resins utilized in the molding compositions of the present invention are thermoplastic polyesters. Preferred polyesters include the condensation products of dicarboxylic acids and diols. The dicarboxylic acid component of more preferred polyesters contain at least 20 percent aromatic dicarboxylic acids selected from terephthalic acid, isophthalic acid, napthalene dicarboxylic acid, diphenyl ether dicarboxylic acid, diphenyl dicarboxylic acid, diphenyl sulfone dicarboxylic acid, diphenoxy ethane dicarboxylic acid and the like. The non-aromatic component of the dicarboxylic acid is selected from succinic acid, adipic acid, sebacic acid and the like.

The diol component of more preferred polyesters may be selected from aliphatic diols containing from two to ten carbon atoms. Such diols include ethylene glycol, diethylene glycol, trimethylene glycol, tetramethylene glycol, cyclohexane dimethanol and the like.

Even more preferred polyesters are poly(alkylene terephthalates) characterized in general by the structural units of Formula I:

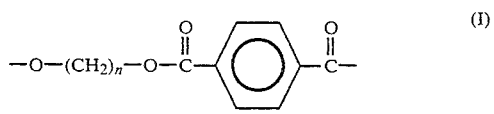

wherein n is an integer between two and six. The most preferred polyester is poly(ethylene terephthalate) (PET).

Suitable linear saturated polyesters are further characterized as having intrinsic viscosities between about 0.3 and about 1.5 g/dL and preferably between about 0.6 and about 1.1 g/dL. Intrinsic viscosity is obtained by extrapolation of viscosity values to zero concentration of solutions of the polyester in a 60/40 vol./vol. ratio blend of 1,1,2,2-tetrachloroethane and phenol at 25° C. Essentially, any thermoplastic polyester suitable for use in molding compositions can be utilized with the present invention. Such polyesters are taught by U.S. Pat. No. 2,465,319 and may be derived by the preparation methods disclosed therein and by U.S. Pat. No. 3,047,539, both of which are hereby incorporated herein by reference thereto.

The polymeric nucleating additives suitable for use in the present invention can be any polymer having pendant ionizable alkali metal phenolate functional groups. Preferably, the polymeric nucleating additive has a $T_g$ less than the $T_g$ of the polyester.

Preferred polymeric alkali metal phenolate nucleating additives of the present invention are capable of increasing the peak crystallization temperature of the polyester at least 15° C. at an alkali level no greater than three parts per hundred parts of polyester. For purposes of this invention, peak crystallization temperature is defined as the peak crystallization temperature as determined by Differential Scanning Calorimetry (DSC). The determination of peak crystallization temperature by DSC is performed by heating a sample of polyester and nucleating agent of approximately 10 mg to a temperature above the equilibrium melting point of the polymer and annealing the sample at this temperature for several minutes. The sample is then cooled at a rate of 20° C./minute. By measuring the temperature of maximum heat evolution, the temperature at which crystallization takes place is readily determined.

The polymeric nucleating additives of the present invention can be alkali metal phenolate homopolymers. Preferably, such a monomeric repeating unit is polymerized with a second monomeric repeating unit having no ionizable groups to provide the polymer with better dispersability in the polyester by breaking up ionic moieties. Block polymers are also included within this definition. At least two percent of the monomeric repeating units of the polymeric nucleating additives of the present invention should contain an ionizable functional group in order for the polymer to function effectively as a nucleating additive.

One example of a second monomeric repeating unit that provides the polymer with better dispersability in the polyester molding resin by breaking up ionic moieties is styrene. However, the second monomeric repeating unit is preferably selected to provide the polymeric nucleating additives of the present invention with the capability of improving a physical property of the polyester molding composition.

Examples of properties which could be improved by selection of the proper second monomer include tensile properties, toughness, and the ability of the nucleating species to disperse into the polyester. Second monomeric repeating units may also be selected that lower the $T_g$ of the polymeric nucleating additives, thereby improving the low temperature crystallization of the polyester molding composition.

Preferred second monomeric repeating units lower the $T_g$ of the polymeric nucleating additive below that of the polyester. More preferred second monomeric repeating units lower the $T_g$ of the polymeric nucleating additive below 80° C. Even more preferred second monomeric repeating units lower the $T_g$ of the polymeric nucleating additive below 70° C.

A preferred group of second monomeric units that lower the $T_g$ of the polymeric nucleating additives and improve the low temperature properties of the polyester molding compositions are the acrylate groups depicted by Formula I:

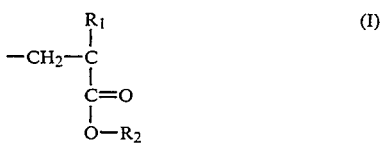

wherein $R_1$ is hydrogen, methyl or ethyl and $R_2$ is an alkyl group containing up to 20 carbon atoms.

The acrylate second monomeric repeating units also make the alkali metal phenolate polymeric nucleating additives elastomeric in character. A nucleating additive with elastomeric qualities provides good surface properties and appearance to molded articles without the addition of plasticizers. Thus, preferred polymeric nucleating additives in accordance with the present invention also function as low $T_g$ elastomeric additives in the polyester melt. Stated another way, the preferred materials function as a combination nucleating additive and plasticizer.

When $R_1$ of the acrylate second monomeric repeating unit is hydrogen, $R_2$ is preferably an alkyl group containing up to 12 carbon atoms. When $R_1$ is methyl, $R_2$ is preferably an alkyl group containing from 4 to 16 carbon atoms. When $R_1$ is ethyl, $R_2$ is preferably an alkyl group containing from 8 to 20 carbon atoms. Examples of such second monomeric repeating units include methyl acrylate, ethyl acrylate, butyl acrylate, isobutyl acrylate, 2-ethylhexyl acrylate, butyl methacrylate, isodecyl methacrylate, lauryl methacrylate, tridecyl methacrylate, dimethyl aminoethyl methacrylate, t-butyl aminoethyl methacrylate, and the like.

The preferred second monomeric repeating units include ethyl acrylate, butyl acrylate, isobutyl acrylate, 2-ethylhexyl acrylate, isodecyl methacrylate, lauryl methacrylate and tridecyl methacrylate. Lauryl methacrylate, butyl acrylate and 2-ethylhexyl acrylate are most preferred.

The second monomeric repeating unit, when present, is present in a ratio with the alkali metal phenolate self-containing monomeric repeating unit between about 100:1 and about 1:1. Ratios between about 50:1 and about 2:1 are preferred, and ratios between about 20:1 and about 3:1 are more preferred.

The polymeric nucleating additive of the present invention should have a weight average molecular weight of at least about 500 Daltons. The maximum molecular weight of the polymeric nucleating additives of the present invention is governed by the $T_g$ required for effective molding. Generally, the weight average molecular weight should be no greater than about 500,000 Daltons. Preferably, polymeric nucleating additives in accordance with the present invention will have molecular weights between about 2,000 and about 100,000 Daltons.

Many of the polymers from which the alkali metal salt polymeric nucleating additives of the present invention are derived are commercially available. The commercially available polymers include poly(p-hydroxy styrene), partially brominated poly(p-hydroxystyrene) and copolymers such as poly(p-hydroxy styrene-styrene) and NOVOLAC phenolic resins. The alkali metal salt is formed by reacting the polymer with an alkali metal hydroxide. The preferred alkali metals are sodium and potassium. Accordingly, the preferred alkali metal hydroxides are sodium hydroxide and potassium hydroxide.

The polymer and alkali metal hydroxide are reacted by separately dissolving the polymer and the hydroxide in a common solvent, or in solvents that are miscible or partially immiscible with one another. The two solutions are then combined, resulting in formation of the alkali metal salt. The polymer is then recovered in its ionomer form by standard methods such as reprecipitation in a nonsolvent and subsequent drying.

A stoichiometric excess of the alkali metal hydroxide may be necessary to insure substantially complete conversion of the ionizable polymer functional groups to the alkali metal salt. The excess base is then removed by repeated washing with a nonsolvent.

Common solvents for the alkali metal hydroxides and the ionizable polymeric nucleating additives of the present invention include alcohols, toluene, THF and the like. As noted above, solutions of polymer and alkali metal hydroxide can be prepared using the same solvent, or different solvents can be used, provided that the solvents selected are miscible with one another.

Polymers presently not commercially available, such as the copolymers of p-hydroxy styrene and lauryl methacrylate or other $T_g$-lowering acrylates can be prepared by conventional free-radical polymerization technology. However, a protected phenolic monomer such as acetoxystyrene should be used as a starting material rather than p-hydroxy styrene in order to prevent competing side-reactions with the phenol group. Each acetoxyphenyl can then be converted to an alkali metal phenolate by reacting the resulting polymer with an alkali metal hydroxide solution according to the method described above with respect to the preparation of alkali metal salts of commercially available polymers. One difference is that instead of recovering the polymer and then forming the alkali metal salt, it is possible to directly form the alkali metal salt by adding the solution of alkali metal hydroxide to the polymerization solution once the polymerization reaction is complete. The resulting polymeric alkali metal salt can then be recovered as described above for the commercially available polymeric starting materials.

When the acetoxystyrene is converted to an alkali metal phenolate salt, acetic acid is formed. Preferably, the alkali metal hydroxide solution will contain at least two equivalents of alkali metal hydroxide, so that cleavage of the acetoxy group readily occurs and both the alkali metal acetate and the phenolate are formed. Alkali metal acetates are known polyester nucleating additives. By converting the acetoxystyrene to an alkali metal phenolate by this method, a polyester nucleating additive mixture can be obtained of the polymeric alkali metal phenolates of the present invention and an alkali metal acetate.

In addition to acetate esters, other phenol monomer protecting groups will function as polyester nucleating additives upon cleavage of the protecting group and formation of the alkali metal phenolate salt. These protecting groups include lower-alkyl carboxylate protecting groups, silicon-containing protecting groups, and the like. Protecting groups that will function as nucleating additives upon cleavage from the polymer can be readily identified by those of ordinary skill in the art. Therefore, the copolymers may also be prepared using a p-hydroxy styrene starting material in which the hydroxyl group is substituted with a lower alkyl carboxylate, a silicon-containing protecting group, and the like.

Cleavage of the protecting group will produce a blend, for example, of the alkali metal phenolate salt polymeric nucleating additive of the present invention with alkali metal lower alkyl carboxylates. Therefore, the present invention also includes nucleating additive blends of the alkali metal phenolate salt of the present invention with alkali metal salts of phenolic monomer protecting groups such as lower alkyl carboxylates.

The amount of alkali metal salts of phenolic monomer protecting groups present in the blends of the present invention is not critical. Any amount will improve the nucleating properties of the blend. The amount present will depend upon the protected phenolic monomeric repeating units in the polymeric starting material.

The molding compositions of the present invention should contain at least that amount of the polymeric alkali metal phenolate nucleating additive of the present invention effective to increase the crystallization temperature of the thermoplastic polyester at least 15° C. This will also result in an increase in the crystallization rate. As the amount of the nucleating additive is increased, the crystallization rate and temperature of the polyester is frequently increased, although this may eventually adversely affect the molecular weight of the polyester and consequently the mechanical properties of the articles molded therefrom, although not to the extent experienced with non-polymeric nucleating additives.

Preferably, the molding composition will contain from about 0.01 to about 1.00 atomic weight percent of the alkali metal resulting from the addition of the polymeric alkali metal phenolate nucleating additive, based on the weight of the thermoplastic polyester. More preferably, the molding composition will contain between about 0.05 and about 0.5 atomic weight percent of the alkali metal relative to the total weight of the polyester.

The molding compositions of the present invention are suitable for use in the production of molded articles using conventional molding apparatus. As such, the molding composition can optionally contain amounts up to 70 percent based on the weight of the polyester of art-recognized additives such as one or more blend-compatible thermoplastic polymers, pigments, dyes or colorants, reinforcing fillers, stabilizers, flame retardants, lubricants, vulcanizing agents, antidegradants, antioxidants, processing aids, adhesives, tackifiers, plasticizers, prevulcanization inhibitors, discontinuous fibers such as glass, wood or cellulose fibers, extender oils, mold release agents, accelerators, mobility enhancers, impact modifiers and other polymeric and non-polymeric nucleating additives such as sodium benzoate, alkali metal acetates, alkali metal salts of poly(acrylic acids) and the like. The molding compositions may be compounded with the non-polymeric nucleating additives, or, as noted above, the non-polymeric nucleating additives may be generated upon conversion of oxy-styrene type polymers to alkali metal phenolate salts.

The blend-compatible thermoplastic polymers suitable for use with the present invention include polymers directly blend compatible with polyesters as well as polymers that require the addition of a compatibilizing agent for blend compatibility. Blend-compatible thermoplastic polymers include polyphenylene ethers such as poly(2,6-diethyl phenylene ether), polycarbonates such as Bisphenol A Polycarbonate, and the like.

The process as mentioned can be carried out using any art-recognized method for incorporating a nucleating additive into a polyester resin. The polymeric alkali metal phenolate nucleating additives of the present invention can be added at any time during the preparation of the molding composition, or they can also be added to the molding composition while it is molten after it has been fully prepared just prior to molding. For example, the polyester, polymeric alkali metal phenolate nucleating additives and any other components can be dry-blended at room temperature followed by melt-mixing using any conventional melt-mixing apparatus, including extruders, calendars, kneaders and the like, at a temperature above the softening point of the polyester, and preferably between about 200° C. and about 300° C. The polymeric alkali metal phenolate nucleating additives of the present invention can also first be compounded with one or more of the optional components such as a filler or impact modifier before dry blending or melt mixing with the polyester. Alternatively, the polyester, polymeric alkali metal phenolate nucleating additives and other components can be brought together in a melt compounder and extruded. The compositions can then be pelletized for molding purposes.

The molding compositions of the present invention can be directly injection molded, melt-spun, cast or extruded. The compositions of the present invention are particularly useful to make injection molded articles.

The following non-limiting examples set forth hereinbelow illustrate certain aspects of the invention. All parts and percentages are by weight unless otherwise noted and all temperatures are in degrees Celsius.

EXAMPLES

In the examples, samples of PET containing the polymeric alkali metal phenolate nucleating additives of the present invention, as well as known nucleating additives for comparison, were prepared and the induction of crystallinity for each was determined by Differential Scanning Calorimetry (DSC) (cooling) using a Perkin-Elmer 7 Series Thermal Analysis System. A sample of a PET molding composition of approximately 10 mg was heated to 280° C. at a rate of 20° C./minute and then cooled at a rate of 20° C./minute. By measuring the heat evolved, the temperature at which the induction of crystallinity occurs, as well as the temperature of maximum heat evolution, indicative of the temperature at which the crystallization takes place, can be readily determined.

EXAMPLE 1

Preparation of Sodium Salt of Poly-p-Hydroxystyrene 25 g of poly-p-hydroxystyrene having a weight average molecular weight of 26,000 (Hoechst-Celanese Corporation) was dissolved in 500 mL tetrahydrofuran (THF). The polymer solution was then added dropwise to about five times the volume of stirred isopropanol solution containing a large molar excess of sodium hydroxide. Upon addition, the polymer precipitated out of solution as a flocculant and the polymer-nonsolvent mixture was allowed to stir overnight to maximize the amount of conversion of the phenol to sodium salt which can occur. The polymer was then filtered and rinsed at least four times with isopropanol to remove as much as possible of the excess NaOH. Subsequently, the polymer was dried in a vacuum oven at 110° C. to remove any remaining isopropanol. One percent by weight of this ionomer was then blended with 2 kg of PET (EniChem Fiber Grade) having an intrinsic viscosity of 0.62 g/dL in a Leistritz twin screw extruder. To test the nucleation ability of the ionomer, the crystallization behavior on heating (from the glass) and on cooling (from the melt) of approximately 10 mg of the resulting blend was analyzed in a Differential Scanning Calorimeter (DSC) and compared with the DSC analysis of pure PET processed in a similar manner. The DSC scans are depicted in FIGS. 1–4, with the results on cooling tabulated in Table I:

TABLE I

| Thermal Analysis Of PET Containing Na Salt Of Poly-p-Hydroxystyrene | | | |
|---|---|---|---|
| | | Crystallization | |
| | Melt Index | Onset | Peak |
| PET (control) | 59 | 204 | 191 |
| 1% Na-modified p-hydroxy PS | 67 | 211 | 207 |

The sodium salt of poly-p-hydroxystyrene thus elevated the PET peak crystallization temperature 16° C. After processing the I.V. of the PET containing 1% sodium-modified p-hydroxy polystyrene had increased to 0.65 g/dL.

EXAMPLES 2–4

Preparation of Sodium Salt of Poly-p-Hydroxystyrene-Styrene

Copolymers were obtained from Hoechst-Celanese Corporation in the following ratios of p-hydroxystyrene to styrene: 10:90, 30:70 and 50:50. The polymers had weight-average molecular weights of 19,300, 18,900 and 20,200, respectively. To prepare the sodium salt of p-hydroxystyrene monomer repeating units, NaOH was employed to remove the acidic phenol hydrogen. 0.1 g of each copolymer was dissolved in 20 mL of THF. For each polymer solution, a stoichiometric equivalent of NaOH was first dissolved in a small amount of methanol to form a very concentrated base solution. The base solution was then added dropwise to the stirring copolymer solution. After removal of the THF and methanol on the rotary evaporator, the materials were vacuum dried overnight at 100° C.

The copolymers were blended with PET using a Haake System 90 melt mixer. The crystallization measurement on cooling by DSC was also repeated as in Example 1. The results are depicted in Table II for the 30:70 and 50:50 ratio copolymers.

TABLE II

| Thermal Analysis Of PEG's Containing Nucleant Ionomers | | | |
|---|---|---|---|
| Nucleant | MI | Onset | Peak |
| 1.0% 30:70 Na-mod. PPHS/PS | 65 | 208 | 203 |
| 1.5% 50:50 Na-mod. PPHS/PS | 73 | 210 | 205 |

The sodium salt of the styrene copolymers thus elevated the PET peak crystallization temperature between 12 and 14° C.

In addition to effectively nucleating the PET as it is cooled from the processing temperature to the mold temperature, an additional desirable benefit of using such a nucleant is to prevent a decrease and if possible to cause an increase in the mobility of the PET at the mold temperature. As Table III demonstrates, high ionic group concentrations cause the glass transition temperature of the nucleant polymer to increase greatly. (This raising of the nucleant $T_g$ can also raise the temperature of crystallization when a PET sample is heated from the glassy state, especially for intermediate ionomer concentrations.)

TABLE III

| Glass Transition Temperatures Of Nucleant Ionomers | |
|---|---|
| Sample | Glass Transition |
| 10:90 Na-mod. PPHS/PS | 105° C. |
| 30:70 Na-mod. PPHS/PS | 177° C. |
| 50:50 Na-mod. PPHS/PS | Not Detectable By DSC |

EXAMPLES 5–10

Preparation Of Sodium Salt Of p-Hydroxystyrene Copolymerized With Lauryl Methacrylate Copolymers of p-hydroxystyrene with lauryl methacrylate were prepared via a free radical polymerization in toluene with azobisisobutyronitrile (AIBN) as the initiator. Hydroxyl-protection of the p-hydroxystyrene was obtained by using p-acetoxystyrene as the starting material.

Six polymerizations were carried out, each beginning by preparing the initiator solutions of AIBN in toluene listed below in Table IV and heating the solutions to 80° C.

TABLE IV

| AIBN Initiator Solutions | | | |
|---|---|---|---|
| Example | Moles AIBN | mL Toluene | Mole % AIBN (Rel. To Monomers) |
| 5 | $4.48 \times 10^{-3}$ | 150 | 0.90 |
| 6 | $6.67 \times 10^{-3}$ | 200 | 1.00 |
| 7 | $2.68 \times 10^{-3}$ | 100 | 0.90 |
| 8 | $2.42 \times 10^{-3}$ | 100 | 0.90 |
| 9 | $5.89 \times 10^{-3}$ | 180 | 0.90 |
| 10 | $1.358 \times 10^{-2}$ | 940 | 1.00 |

The six polymerizations varied by the molar ratios of p-acetoxystyrene and lauryl methacrylate reacted. Monomer solutions were prepared by dissolving both monomers in toluene. The monomer solutions were added dropwise via an addition funnel to the stirring initiator solutions.

The quantities of p-acetoxystyrene (AS) lauryl methacrylate (LM) and toluene are listed in Table V:

TABLE V

| Example | Moles LM | Moles AS | mL Toluene |
|---|---|---|---|
| 5 | .170 | .326 | 150 |
| 6 | .341 | .326 | 200 |
| 7 | .102 | .195 | 80 |
| 8 | .205 | .065 | 110 |
| 9 | .065 | .586 | 150 |
| 10 | 1.228 | .130 | 200 |

After letting the reactions run at least 4 hours, the reaction vessels were allowed to cool and concentrated solutions of NaOH in methanol were added to the polymer solutions, containing two moles of NaOH for each mole of acetoxystyrene monomeric repeating unit. To allow the conversion of the acetoxy group to a sodium phenolate, the solutions were allowed to stand overnight. The polymers were then reprecipitated in acetone with a 1:10 ratio of solution:nonsolvent. After rinsing and air drying, the polymers were vacuum dried at least two days to remove the remaining nonsolvent. Elemental analysis for Na was then employed to determine the approximate ratios of pendant sodium phenolate to residual sodium acetate. The results are depicted in Table VI for Examples 5-9:

TABLE VI

| | Nucleant Composition | | |
|---|---|---|---|
| EXAMPLE | Mole % NaPHS In Ionomer | Elem. Anal. Wt. % Na | Approx. Wt. % Residual Na Acetate In Nucleant |
| 5 | 49 | 11.3 | 27 |
| 6 | 66 | 13.1 | 26 |
| 7 | 24 | 5.2 | 11 |
| 8 | 90 | 16.6 | 24 |
| 9 | 10 | — | — |

EXAMPLES 11-15

The polymers of Examples 5-9 were then blended with PET in the ratios shown in Table VI in a Leistritz twin screw extruder at 270° C. Analysis of the blended materials was then carried out by DSC, solution viscometry, and determination of melt index. Selected results are depicted in Table VII.

TABLE VII

| | Thermal Analysis of PET's Containing Nucleant Ionomers | | | | | | |
|---|---|---|---|---|---|---|---|
| | | | | COOLING | | HEATING* | |
| EXAMPLE | NUCLEANT | I.V. | MI | ONSET | PEAK | ONSET | PEAK |
| 11 | 1.0% Example 5 | 0.60 | 53 | 214 | 211 | — | — |
| 12 | 0.5% Example 5 | — | 58 | 214 | 210 | — | — |
| 13 | 0.5% Example 7 | 0.62 | 41 | 215 | 211 | 110 | 116 |
| 14 | 4.0% Example 9 | 0.59 | 44 | 216 | 212 | 98 | 105 |
| 15 | 1.0% Example 1 | 0.65 | 57 | 211 | 207 | 107 | 113 |

*The crystallization peak of pure PET heated in the DSC at 10°/min. is 128° C. and for PET with 1% sodium benzoate is 110° C.

Figure 5:
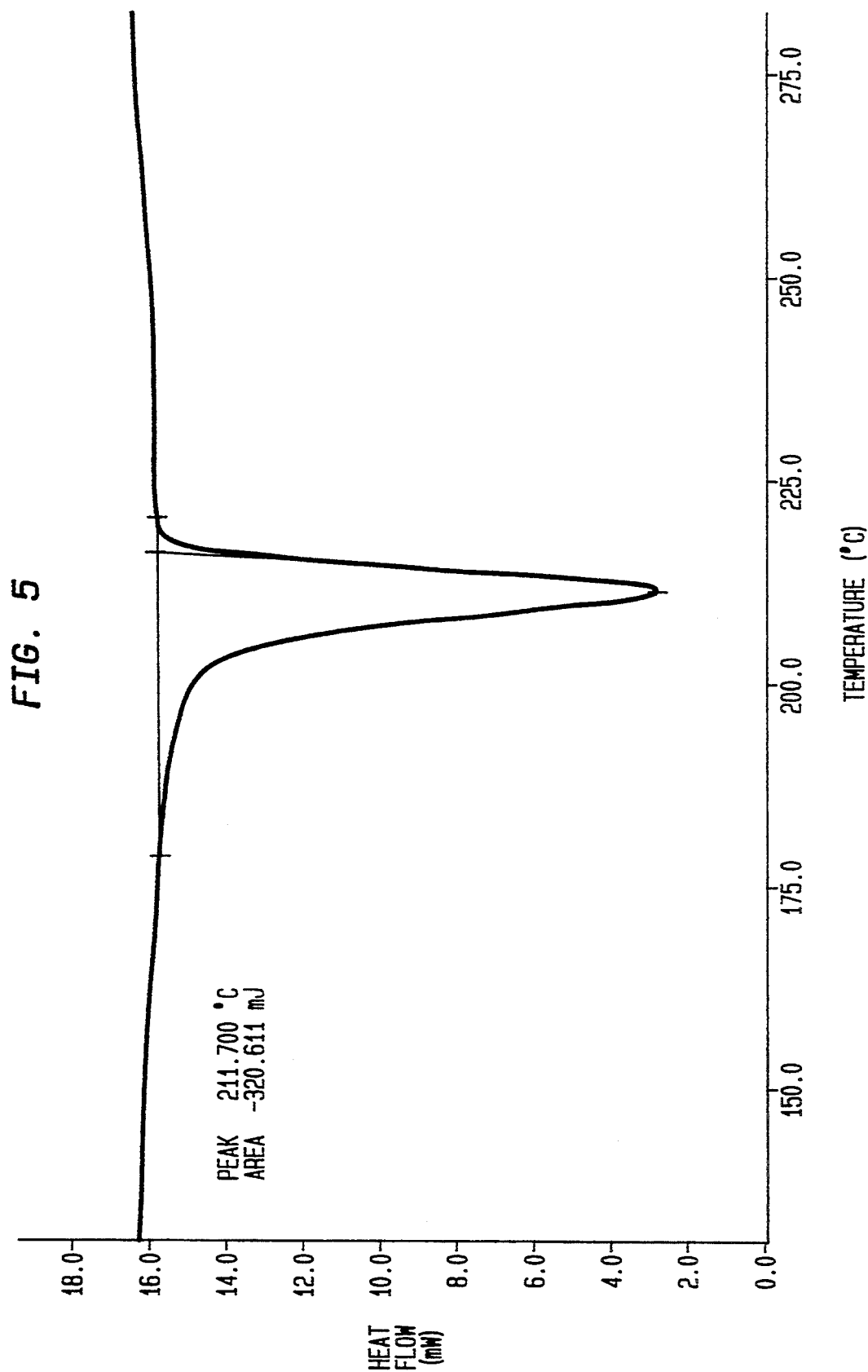
FIG. 5 depicts a DSC scan of the polyester of FIG. 1 containing 4% by weight of sodium modified poly(p-hydroxystyrene-lauryl methacrylate), and performed under the same conditions.

The sample of Example 14, containing 4% of the nucleant of Example 9 exhibited excellent crystallization behavior at both low and high temperatures. After annealing at 290° C. for two minutes and then cooling at 20° C./min., the onset and peak for the blend crystallization occurred at 216° C. and 212° C. respectively, as compared to 199° C. and 188° C. for pure PET. This DSC scan is depicted in FIG. 5. The PET cold crystallization temperature was lowered by 8° with the addition of the nucleant. The DSC scan on heating is depicted in FIG. 6.

It will therefore be appreciated, in accordance with this invention, that both the rate and temperature of crystallization of polyester resins can be significantly increased by incorporating into polyester resin molding compositions polymeric nucleating additives having pendant ionizable alkali metal phenolate groups. The foregoing description of the preferred embodiment should be taken as illustrating, rather than as limiting the present invention as defined by the claims. As will be readily appreciated, numerous variations and combinations of the features set forth above can be utilized without departing from the present invention as set forth in the claims. Such variations are not regarding as a departure from the spirit and scope of the invention, and all such modifications are intended to be included in the scope of the following claims.

What is claimed is:

1. A molding composition comprising a thermoplastic polyester and a polymeric nucleating additive consisting of a polymer comprising first and second monomeric repeating units, wherein said first monomeric repeating unit comprises a pendant ionizable alkali metal phenolate group, and said second monomeric repeating unit comprises a comonomer which is selected to provide said polymeric nucleating additive with a lower $T_g$ than said polyester.

2. The composition of claim 1, wherein said polyester is a poly(alkylene terephthalate) comprising repeating units of the formula:

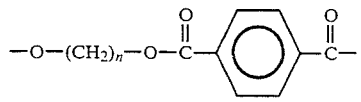

wherein n is an integer between two and six.

3. The composition of claim 2, wherein said poly(alkylene terephthalate) is PET.

4. The molding composition of claim 1, wherein said second monomeric repeating unit is selected from the group consisting of acrylate groups having the formula:

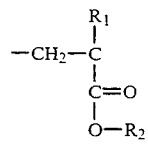

wherein $R_1$ is selected from the group consisting of hydrogen, methyl and ethyl groups and $R_2$ is an alkyl group containing up to 20 carbon atoms.

5. The molding composition of claim 4, wherein said second monomeric repeating unit is selected from the group consisting of lauryl methacrylate, methyl acrylate, ethyl acrylate, butyl acrylate, isobutyl acrylate, 2-ethylhexyl acrylate, butyl methacrylate, isodecyl methacrylate, tridecyl methacrylate, dimethylaminoethyl methacrylate and t-butylaminoethyl methacrylate.

6. The molding composition of claim 1, further comprising an alkali metal salt of a lower alkyl carboxylate.

7. The molding composition of claim 1, wherein said polymeric nucleating additive is present in an amount effective to increase the crystallization temperature of said polyester at least 15° C.

8. The molding composition of claim 7, wherein the alkali metal component of said polymeric nucleating additive is present in an amount from about 0.01 to about 1.00 atomic weight percent of said polyester.

9. The molding composition of claim 1, wherein said ionizable alkali metal phenolate groups comprise at least two percent of the structural repeating units of said polymeric nucleating additive.

10. The molding composition of claim 1, wherein said alkali metal is selected from the group consisting of sodium and potassium.

11. A molded article prepared from the molding composition of claim 1.

12. A process for increasing the crystallization rate and crystallization temperature of a thermoplastic polyester, which process comprises incorporating into said polyester a polymeric nucleating additive consisting of a polymer comprising first and second monomeric repeating units, wherein said first monomeric repeating unit comprises a pendant ionizable alkali metal phenolate group, and said second monomeric repeating unit comprises a comonomer which is selected to provide said polymeric nucleating additive with a lower $T_g$ than said polyester.

13. A process according to claim 12, wherein said polymeric nucleating additive is incorporated into said polyester at a temperature between about 200° C. and about 300° C.

14. A process according to claim 12, wherein said incorporating step comprises incorporating into said polyester an amount of said polymeric nucleating additive effective to increase the crystallization temperature of said polyester at least 15° C.

15. A process according to claim 12, wherein said incorporating step comprises incorporating into said polyester from about 0.10 to about 10 percent by weight of said polyester of said polymeric nucleating additive.

16. A process according to claim 12, wherein said polyester is PET.

* * * * *

UNITED STATES PATENT AND TRADEMARK OFFICE
CERTIFICATE OF CORRECTION

PATENT NO. : 5,414,036
DATED : May 9, 1995
INVENTOR(S) : Gilmer

It is certified that error appears in the above-indentified patent and that said Letters Patent is hereby corrected as shown below:

On the title page: Item [54] and

Column 1, line 1, "RAPIDLY CRYSTALLIZING POLYESTER" should read --RAPIDLY CRYSTALLIZING POLYESTER MOLDING COMPOSITIONS--.

Column 1, line 24, delete "MOLDING COMPOSITIONS".

Column 6, line 42, "-polyester" should read --polyester--.

Signed and Sealed this

Twenty-ninth Day of August, 1995

Attest:

BRUCE LEHMAN

*Attesting Officer*  *Commissioner of Patents and Trademarks*